US005230765A

United States Patent [19]

Weiselfish et al.

[11] Patent Number: 5,230,765

[45] Date of Patent: Jul. 27, 1993

[54] AUTOMATED LABELING APPARATUS

[75] Inventors: Jacob Weiselfish, West Hartford; Leon Vilner, Newingtown; Michael T. Silva, Enfield, all of Conn.

[73] Assignee: Apparel Technology Systems, Inc., South Windsor, Conn.

[21] Appl. No.: 957,625

[22] Filed: Oct. 6, 1992

Related U.S. Application Data

[63] Continuation of Ser. No. 533,873, Jun. 6, 1990.

[51] Int. Cl.[5] .............................................. B32B 31/00

[52] U.S. Cl. .................................... 156/350; 156/523; 156/538; 156/542; 156/574

[58] Field of Search ............... 156/354, 361, 384, 523, 156/538, 574, 542

[56] References Cited

U.S. PATENT DOCUMENTS

| | | | |
|---|---|---|---|
| 3,495,492 | 2/1970 | Gerber et al. | 83/374 |
| 3,748,210 | 7/1973 | Beutl | 156/567 |
| 3,776,074 | 12/1973 | Pearl et al. | 83/764 |
| 3,893,388 | 7/1975 | Kronseder et al. | 156/571 |
| 4,028,167 | 6/1977 | Gerber | 156/384 |
| 4,125,943 | 11/1978 | Ando | 318/568.1 X |
| 4,285,752 | 8/1981 | Higgins | 156/267 X |
| 4,514,246 | 4/1985 | Forrer et al. | 156/264 |
| 4,640,222 | 2/1987 | Gerber | 118/697 |
| 4,665,619 | 5/1987 | Pearl | 33/32.4 |
| 4,764,880 | 8/1988 | Pearl | 346/29 |
| 4,789,419 | 12/1988 | Hermann | 156/499 |
| 4,848,256 | 7/1989 | Ohchi | 112/235 |

*Primary Examiner*—David A. Simmons
*Assistant Examiner*—James J. Engel, Jr.
*Attorney, Agent, or Firm*—Morgan & Finnegan

[57] ABSTRACT

An automated labeling apparatus is provided for positioning and applying identifying labels on predetermined positions along a layup of sheet material prior to cutting. The apparatus includes multiple labeling carriage assemblies mounted on a support beam for independent movement thereon. At least one label printer-load station is attached to the apparatus so as to be accessible to the labeling carriage assemblies for providing preprinted identifying labels. A central processing computer controls movement of the support beam and the labeling carriage assemblies as well as the functioning of the label printer-load station so as to coordinate operation of the labeling carriage assemblies for efficient operation.

21 Claims, 8 Drawing Sheets

AUTOMATED LABELING APPARATUS

This is a continuation of co-pending application Ser. No. 07/533,873, filed on Jun. 6, 1990.

BACKGROUND OF THE INVENTION

1. Field of the Invention

The present invention relates to automated labeling apparatus for placing identification labels on a layup of sheet material. More particularly, this invention is directed to computer controlled apparatus having a plurality of labeling carriages on a supporting beam working in unison to position and apply identification labels on predetermined positions on a top layer of a layup of sheet material prior to cutting.

2. Description of Related Art

Various systems and methods have been used in the art to cut and label a predetermined nest of pieces from a plurality of plies of sheet material known as a layup. Initially, the layup of sheet material was laboriously cut by hand. Uniformity of the cut pieces was obtained by overlying the layup of sheet material with a plotted representation of the patterned pieces. This plotted representation defined the perimeter that was to be followed during the manual cutting procedure. Further, the plotted representation could be extensively annotated with identifying indicia which would remain with the cut pattern pieces when they were removed to the sewing room for assembly into the finished product. This identifying indicia includes such information as size, location, assembly order, etc. which is essential to proper and efficient completion of the finished product.

With the development of automated cutting systems, such as that shown in U.S. Pat. No. 3,495,492 entitled APPARATUS FOR WORKING ON SHEET MATERIAL, the cutting operation was greatly simplified. However, the need for placement of identifying indicia on the cut pattern pieces remained. With automated cutting systems, once the plies of sheet material have been spread on long commercial spreading tables, the layup is moved onto the bed of an automated cutting system. This system is preprogrammed to cut a nest of pattern pieces from the sheet material positioned beneath it.

In order to identify the cut pattern pieces from the layup, a plotted representation of the nest of pattern pieces is spread across the top of the layup prior to cutting. As in the manual cutting procedure discussed above, the current plotted representation may include the perimeter outline of each pattern piece as well as identifying indicia for each individual piece positioned within that perimeter outline.

Once in position, both the plotted representation and the layup of sheet material are cut simultaneously leaving a stack of pattern pieces topped with a similarly shaped portion of the plotted representation bearing individualized identifying indicia for that particular pattern piece. The stacks of pattern pieces are then routed through the manufacturing/assembly stages to generate the finished product.

The use of a plotted representation has several inherent drawbacks and disadvantages. For example, one major drawback that is readily apparent is the excessive cost of superfluous plotting paper. In the garment industry alone, a tremendous amount of paper is used to create the plotted representations for the voluminous number of pattern pieces cut each day. Since the automated cutting systems do not need the plotted periphery to follow, the major bulk of the paper occupying that periphery is waste. In effect, the only necessary portion of the plotted representation is the small area occupied by the identifying indicia. Apart from the costs associated with this wasted paper, other related costs include plotting equipment, labor costs, storage of large rolls of plotting paper, ink and disposal of waste paper.

Another drawback to the use of plotted representations is the serious concern of losing the identifying indicia for stacks of pattern pieces prior to manufacture and/or assembly Since the plotted representation is simply spread out over the layup of sheet material, it is difficult to ensure that the cut portions stay with the appropriate stack of cut pattern pieces This is particularly true for smaller pieces which are easily confused or misplaced.

One apparatus developed to address these drawbacks is shown in U.S. Pat. No. 4,028,167 entitled LABEL APPLICATOR FOR AUTOMATICALLY CONTROLLED CUTTING MACHINE. This apparatus mounts a label applicator with the automated cutting tool on the support beam of a cutting table above the layup of sheet material. As an individual pattern piece is cut by the cutting tool, the label applicator affixes a label containing identifying indicia to the cut piece.

While this apparatus attempts to solve some of the aforementioned problems, it does not address all of them and, in some instances, creates others. For example, when the layup of sheet material is cut with automated cutting apparatus, a vacuum system is usually used to hold down the layup so that it doesn't move. This vacuum system takes the form of a foraminous table through which a vacuum is drawn. In order to enhance this hold down vacuum, a cover film is placed over the layup prior to cutting. This combination serves to compress the layup of sheet material and hold it in place to facilitate the cutting operation.

After cutting, the label applicator, mounted adjacent the cutting tool, moves into position to apply the label. However, because the cover film overlies the layup, the label applicator is actually affixing the label to the cover film covering the stack of cut pattern pieces. Accordingly, one is still faced with the risk of losing or confusing the identifying indicia, particularly for smaller pattern pieces.

As discussed above, prior to the cutting operation, plies of sheet material are spread out and inspected on long spreading tables. Most manufacturing facilities utilize a number of these long spreading tables to provide a continuous series of layups of spread sheet material to a single automated cutting operation. Because the spreading operation is much quicker than the cutting operation, there is typically a substantial lag time while the spread sheet material awaits transfer to the cutting operation. Using an integral cutting-labeling apparatus of the type described above, the amount of time necessary for the cutting operation is tremendously increased over conventional automated cutting operations. This is because the label applicator operates in sequence with the cutting tool to label a pattern piece after it has been cut. Therefore, one operation, either labeling or cutting, is stopped while the other is proceeding. Also, should a malfunction occur in either the labeling or cutting tool, the entire cutting/labeling operation ceases until the malfunction is corrected. This is a serious consideration in, for example, the garment industry where time and throughput are critical pricing and profit considerations.

Therefore, it would be highly desirable to have an automated labeling apparatus which could apply identifying indicia at predetermined positions directly on a layup of sheet material while it is on the spreading table prior to and independent from the automated cutting operation.

Accordingly, it is one object of the present invention to provide automated labeling apparatus, operable independent of the cutting operation to apply identifying labels to a layup of sheet material.

It is a further object of the present invention to provide automated labeling apparatus which can securely apply identifying labels directly onto the top layer of a layup of sheet material prior to cutting.

It is also an object of the present invention to provide automated labeling apparatus which employ multiple labeling carriages working in conjunction to efficiently apply identifying labels to predetermined positions on a layup of sheet material prior to cutting.

These and other highly desirable and unusual results are accomplished by the present invention in an automated labeling apparatus having a plurality of labeling carriages on a supporting beam working in unison to position and apply identifying labels on predetermined positions along a layup of sheet material.

Objects and advantages of the invention are set forth in part herein and in part will be obvious therefrom, or may be learned by practice with the invention, which is realized and attained by means of the instrumentalities and combinations pointed out in the appended claims. The invention consists of novel parts, constructions, arrangements, combinations, steps and improvements herein shown and described.

SUMMARY OF THE INVENTION

According to the present invention, an automated labeling apparatus is provided for positioning and applying identifying labels on predetermined positions along a layup of sheet material prior to cutting The apparatus includes multiple labeling carriage assemblies mounted on a support beam for independent movement thereon. At least one label printer-load station is attached to the apparatus so as to be accessible to the labeling carriage assemblies for providing preprinted identifying labels. A central processing computer controls movement of the support beam and the labeling carriage assemblies as well as the functioning of the label printer-load station so as to coordinate operation of the labeling carriage assemblies for efficient operation.

The apparatus is adapted for movement in the X, Y, Z Cartesian coordinate system with the support beam carrying the labeling carriage assemblies along the table containing the layup and the labeling carriage assemblies adapted for transverse movement along the support beam and in the vertical direction.

In one embodiment of the present invention, a rotatable drum capable of releasably holding six preprinted labels simultaneously is used with each labeling carriage assembly to facilitate even faster throughput times. This is accomplished by substantially reducing the number of times the labeling carriage assembly must return to the label printer-load station during a labeling operation.

BRIEF DESCRIPTION OF THE DRAWINGS

The accompanying drawings, referred to herein and constituting a part hereof, illustrate the preferred embodiments of the apparatus of the present invention, and, together with the description serve to explain the principles of the invention.

DETAILED DESCRIPTION OF THE PREFERRED EMBODIMENTS

Figure 1:
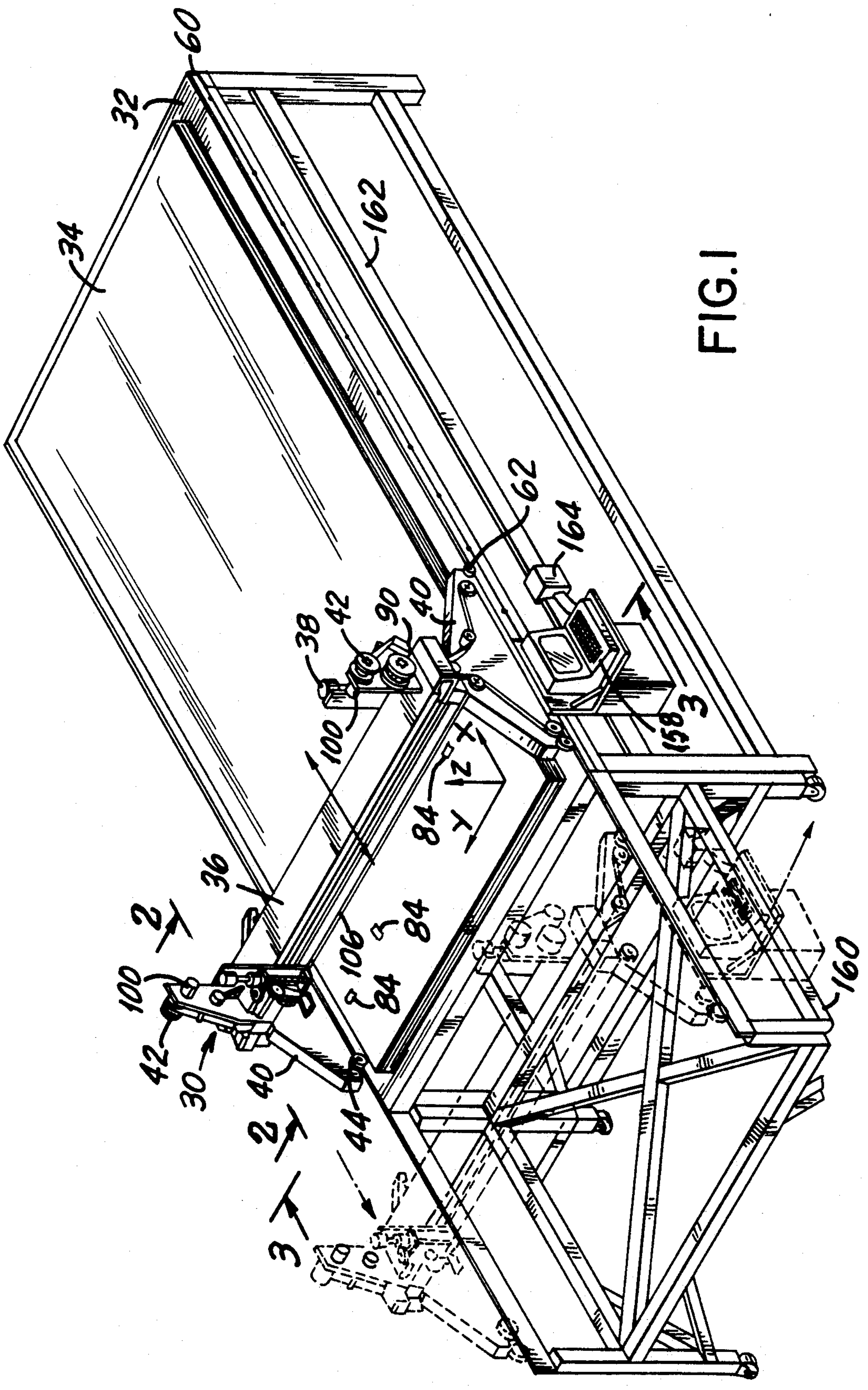
FIG. 1 is a perspective view of an automated labeling apparatus with transfer table in accordance with one embodiment of the present invention.

FIG. 1 shows a preferred embodiment of an automated labeling apparatus, generally designated 30, in position on a spreading table 32 over a layup of sheet material 34 spread thereon. The apparatus 30 includes a rectangular hollow support beam 36 having a plurality of label carriage assemblies 38 mounted thereon for longitudinal movement.

Support beam 36 is maintained above spreading table 32 by means of side supports 40 positioned at either end of the beam 36. A printer-load station 42 is also provided on either end of support beam 36 in a position accessible to a corresponding label carriage assembly 38.

Support beam 36 is movable in an illustrated X-coordinate direction by friction wheels 44 positioned on side supports 40. Wheels 44 travel along the outside surface of the spreading table 32 and are provided in aligned pairs on each side support 40. Wheels 44 are preferably formed with high friction tread to prevent slippage. One particularly advantageous type of wheel is a 90 durometer polyurethane friction wheel available from Meridian Laboratories in Middleton, Wis.

Figure 2:
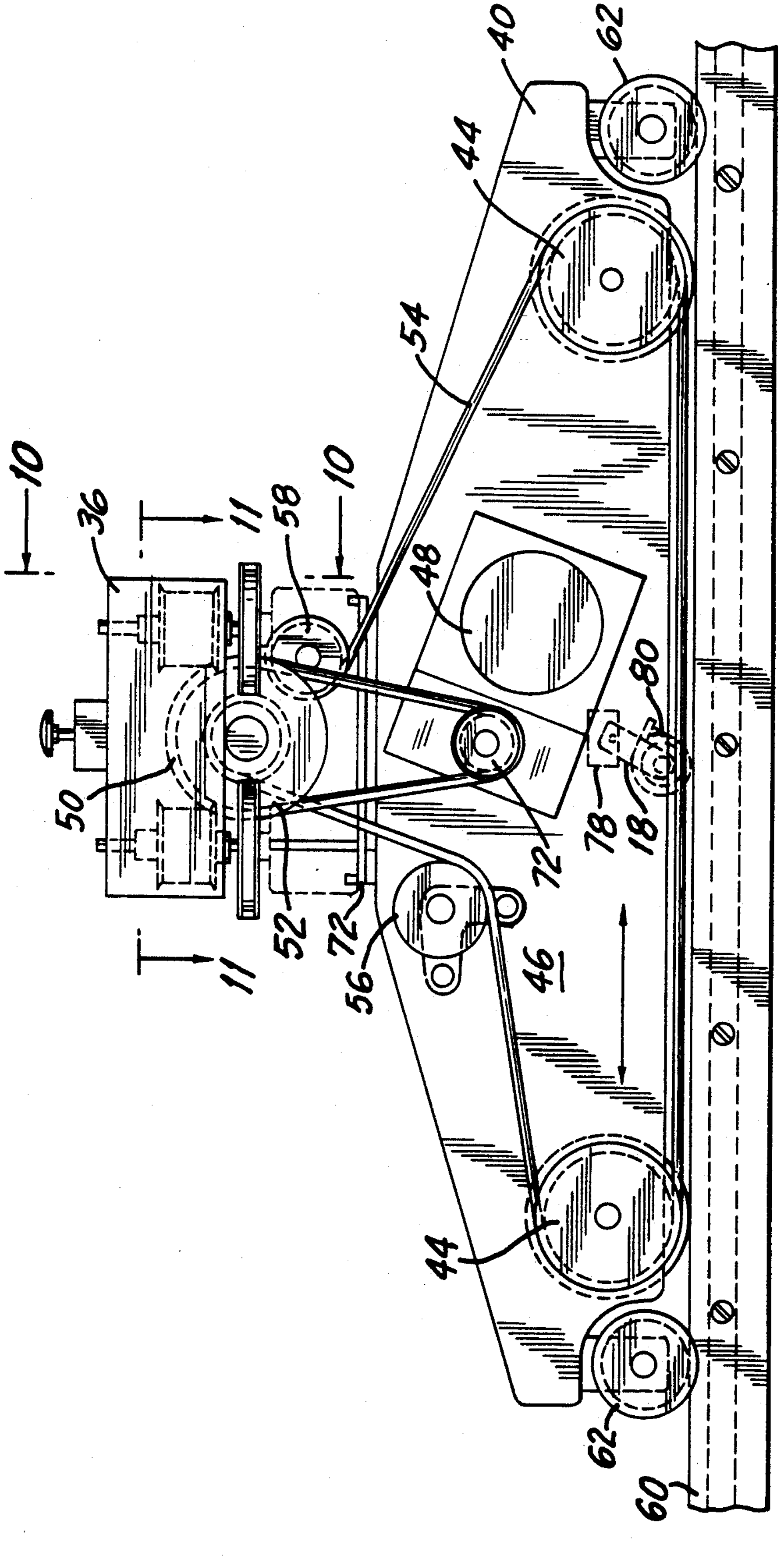
FIG. 2 is a side view taken along line 2—2 of FIG. 1 of an automated labeling apparatus showing the drive system.

Friction wheels 44 are driven in the X-coordinate direction by a belt driving system shown generally at 46 in FIG. 2. A DC servo motor 48 mounted to side support 40 drives a torque translation tube 50 by means of timing belt 52. Torque translation tube 50 extends through rectangular hollow support beam 36 and translates the torque of the DC servo motor 48 to uniformly drive both pairs of friction wheels 44.

A drive belt 54 interconnects each pair of friction wheels 44 to a corresponding end of the torque translation tube 50 such that both pairs of friction wheels 44 are driven evenly along the spreading table 32. Tension is maintained on the drive belts 54 by belt tensioning pulleys 56 and 58. Where greater accuracy and reduced slippage is desired, timing belt 52 and drive belts 54 may be positive drive belts interfitting timing belt pulleys and wheels. In the present embodiment, timing belt 52 and drive belts 54 are fabricated from polyurethane however, a wide variety of other belting material could be substituted including rubber, plastics and metals.

Figure 3A:
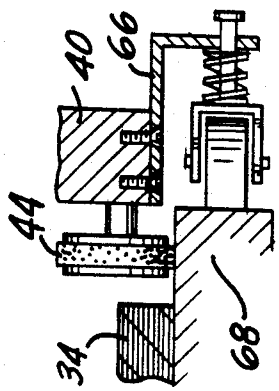
FIG. 3*a* is a frontal view in partial cross-section of an alternate steering and alignment structure.
Figure 3:
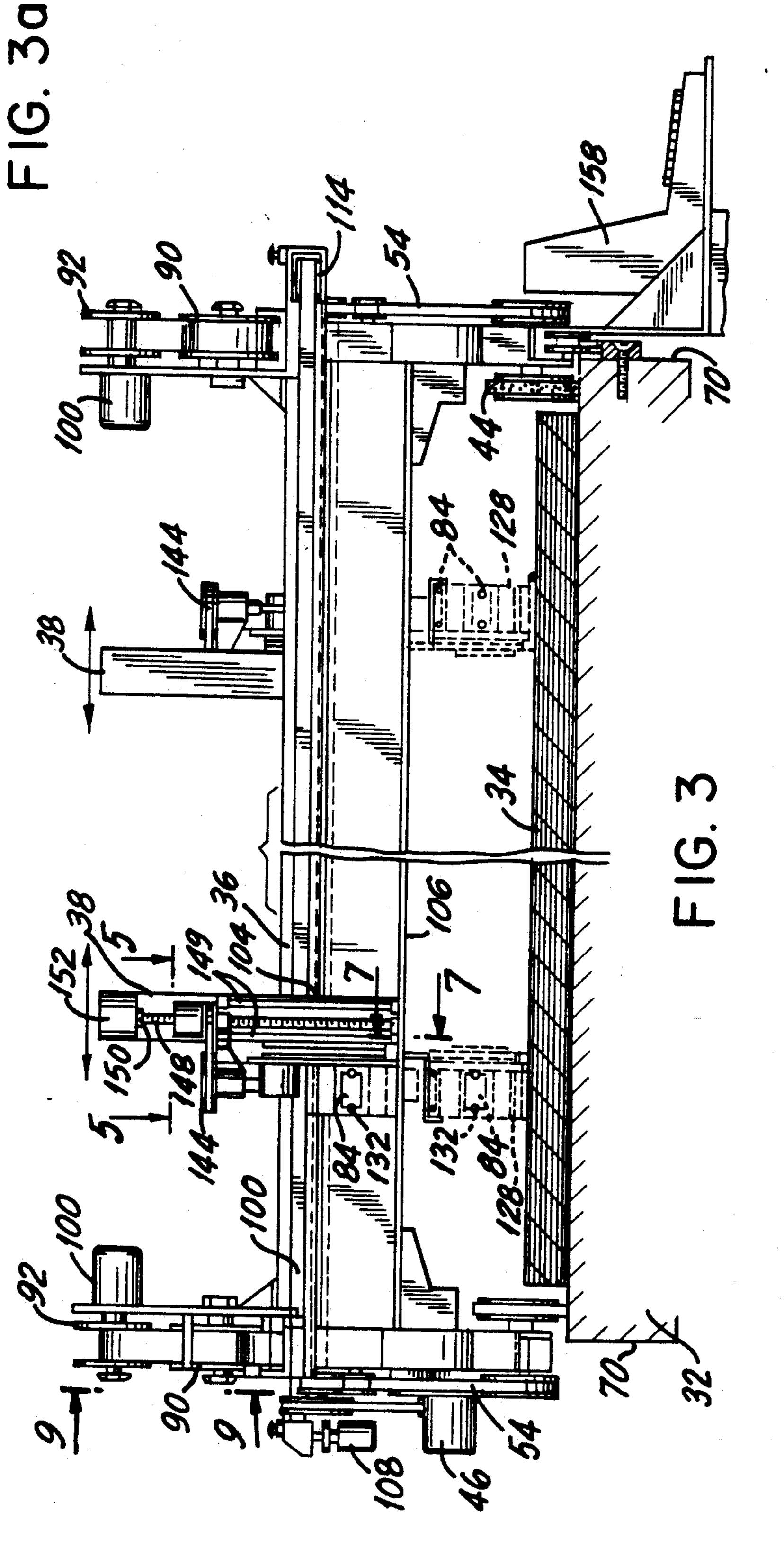
FIG. 3 is an end view taken along line 3—3 of FIG. 1 of an automated labeling apparatus showing the labeling carriage assemblies, printer-load stations and central processing unit.
Figure 5:
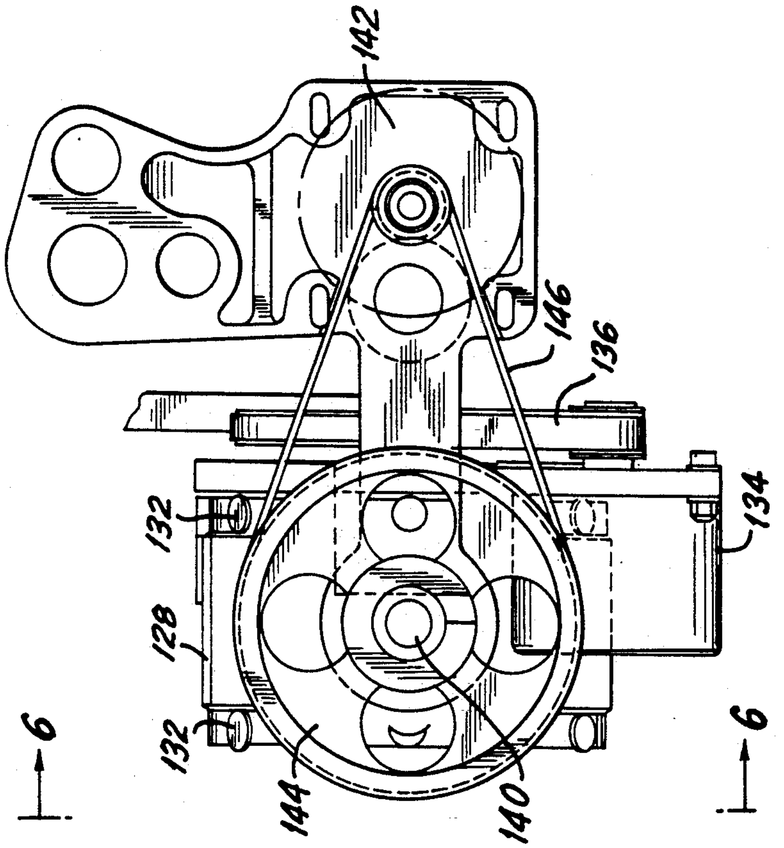
FIG. 5 is a plan view taken along line 5—5 of FIG. 3 of a label carriage assembly in accordance with one embodiment of the present invention.

In one particularly advantageous embodiment of the present invention the spreading table 32 is provided with a shoulder track 60 along a longitudinal outside edge (See FIGS. 1-3). A pair of grooved track wheels 62 is provided on the side support 40 corresponding to shoulder track 60 to guide and align the automated labeling apparatus 30 as it is driven along the spreading table 32.

Where a spreading table is not provided with a shoulder track 60 (best seen in FIG. 3A), the grooved track wheels 62 are replaced with spring loaded rollers 66 on both sides of the table. The rollers 66 contact the vertical edges 70 of spreading table 68, perpendicular to the table surface. The spring loaded rollers 66 serve to compensate for irregularities in the width of the spreading table 68 while maintaining the automated labeling apparatus 30 in alignment as it is driven along spreading table 68 by friction wheels 44.

Due to the non-uniform flatness of the spreading table surface over which hollow beam 36 travels, it is preferred that only one of the side supports 40 is mounted rigidly to the beam. It is particularly advantageous to provide a pivot 72 at the intersection of the side support which mounts the DC servo motor 48. The pivot 72 allows the beam 36 to compensate for surface anomalies in the table 32 and still maintain all of the friction wheels 44 in contact with the table surface. This pivot 72 effectively translates the four point support system created by friction wheels 44 into a three point floating support system.

In embodiments utilizing the pivotally mounted beam structure, maintaining proper tension on the driving belts 54 and the timing belt 52 is an important factor. One means of addressing this is to mount the DC servo motor drive pulley 74 directly beneath the torque translation tube 50, on the same geometric axis. With this arrangement, the tension on the belts is maintained despite pivotal motion of the beam.

The automated labeling apparatus 30 is adapted for controlled movement along the length of the spreading table 32. In the present embodiment, the linear positioning of the apparatus along spreading table 32 is accomplished by an optical encoder 76 mounted to the side support 40 adjacent rail 60 on a spring loaded mounting plate 78. A polyurethane friction wheel 80 is mounted to the shaft of the encoder 76. As the apparatus moves along the spreading table 32, contact between the spreading table surface and the encoder 76 results in a translation of the linear motion of the apparatus to rotational motion of the encoder 76. The apparatus utilizes the encoder feedback information for both closed loop servo control and positional feedback.

At least one printer-load station 42 is provided with the automated labeling apparatus of the present invention in order to print and deliver information labels 84 to a plurality of label carriage assemblies 38. In a preferred embodiment of the present invention, one printer-load station 42 is secured to each end of support beam 36. The printer-load station supports a label supply, a label printer and means for delivering the printed labels to a label carriage assembly 38. In the embodiment shown in FIG. 9, a web of material containing adhesive backed blank labels 86 on roller 90 is supported on mounting plate 82. A take up roller 92 is positioned above roller 90 to collect the carrier web of material 98 after the printed labels have been removed.

The web of blank labels 86 is threaded to thermal printer 94 mounted in the same vertical plane as roller 90. Thermal printers are well known in the art and are available from a variety of commercial sources including Seiko Instruments USA Inc. of Torrance, Calif. Although a thermal printer is used in this embodiment of the invention, any acceptable printer can be utilized including electrostatic, ink jet, or other type. The thermal printer 94 is capable of both alphanumeric and bar code printing. Predetermined information in the desired form is printed on the label as the web passes through the printer 94.

A sharply angled peeler bar 96 is positioned beyond the printer 94 and serves to remove the printed adhesive backed label 84 from the carrier web 98 as the web passes over the edge of the peeler bar 96. The carrier web 98 is then wound onto take up roller 92.

A motor 100 is coupled to take up roller 92 through a clutch mechanism to ensure uniform tension on the web during advancement. In addition, stationary idlers 102 are provided to guide the web along the loop from roller 90 to takeup roller 92.

The type and characteristics of the label material used will be determined by the particular application. For example, in the garment industry the material onto which the label is applied is usually a woven fabric type and the labels should adhere reliably. The label should also be easily removable without damaging the material or leaving any adhesive residue. In a particularly advantageous embodiment of the present invention, blank labels supplied by Ever Ready Label, Belleville, N.J. as thermal paper no. Ricoh-130LAM are used These labels have been found to provide good adhesion and be easily and completely removable without adhesive residue.

A plurality of label carriage assemblies 38 are mounted on hollow support beam 36 for controlled longitudinal movement thereon In the present embodiment, two label carriage assemblies 38 are mounted on opposing vertical faces of support beam 36. The two label carriage assemblies 38 of the present embodiment are mounted on bearing carriages movably supported longitudinally on a circular rail 104 which is mounted along the front and rear vertical faces of the beam 36. It is contemplated that addition label carriage assemblies may be incorporated on the support beam to enhance labeling speed and capacity For example, the carriages may be arranged in various configurations including the use of three carriage assemblies, each responsible for overlapping areas of the layup or four or more carriage assemblies designed to cooperate to label predefined portions of the layup.

An opposing cam and roller are used to secure the lower end of the label carriage assemblies 38 to U-shaped longitudinal channels 106 formed in the lower vertical of faces of the support beam 36. This provides a secure and stable attachment for the label carriage assembly and prevents rotation about circular rail 104.

The label carriage assemblies 38 are capable of unrestricted movement along the Y-coordinate direction and can move independent of each other. One particularly advantageous bearing assembly is the Round Way® bearing available from Thomson Industries, Inc. of Port Washington, N.Y.

Figure 10:
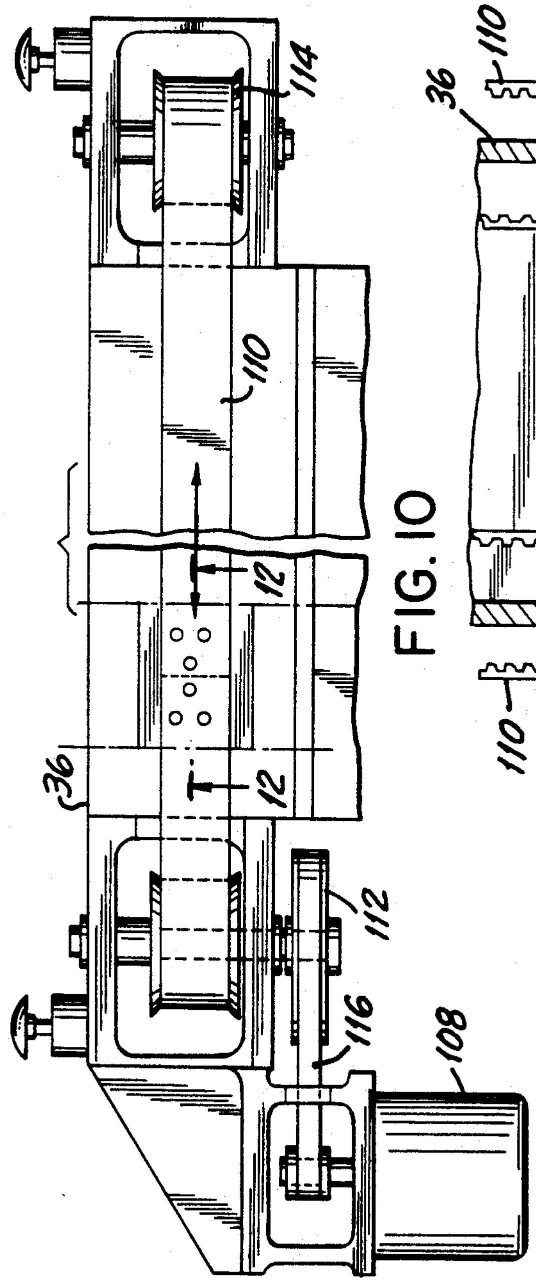
FIG. 10 is a frontal view taken along line 10—10 of FIG. 2 showing the belt drive for the support beam wheels.
Figure 11:
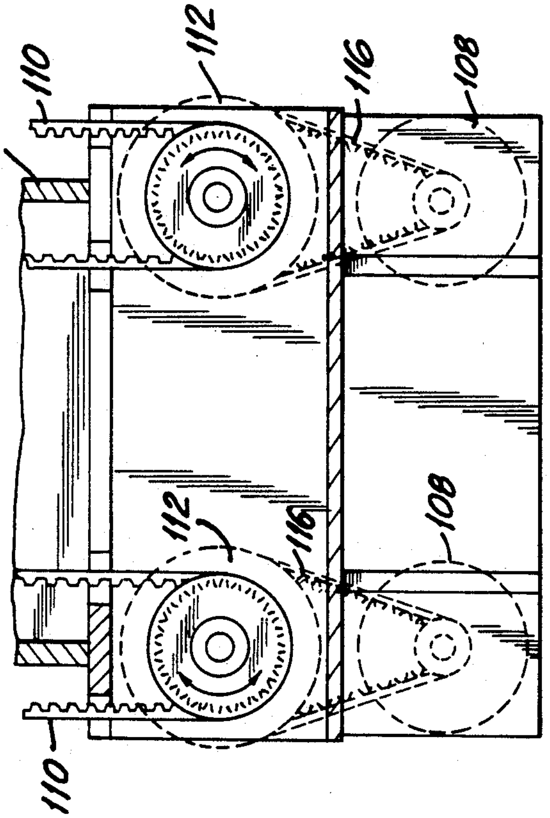
FIG. 11 is a fragmentary plan view taken along line 11—11 of FIG. 2 of the belt drive system for the labeling carriage assemblies in accordance with one embodiment of the present invention.
Figure 12:
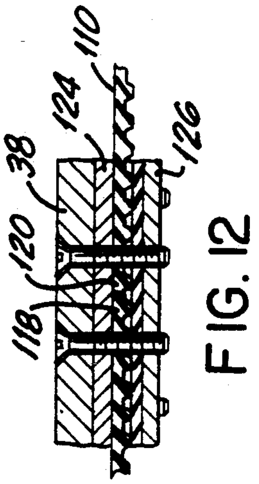
FIG. 12 is a cross-sectional view taken along line 12—12 of FIG. 10 showing the structure of the joined positive drive belt.

Referring to FIGS. 10–12, each label carriage assembly 38 is drive in the Y-coordinate direction by a DC servo motor 108 connected to a polyurethane Gilmer or positive drive belt 110. Drive pulley assembly 112 is mounted at one end of hollow support beam 36 with idler pulley 114 mounted at the opposite end thereof in the same longitudinal plane. Positive drive belt 110 is tensioned between both the drive pulley assembly 112 and the idler pulley 114 such that half of the length of belt 110 is positioned outside hollow support beam 36 and the other half of the length of the belt 110 is routed inside the beam 36. A separate DC servo motor drive belt 116 interconnects the shaft of DC servo motor 108 and drive pulley assembly 112.

In one particularly advantageous embodiment, positive drive belt 110 is formed by joining proximate 118 and distal ends 120 of a length of drive belt material as shown in FIG. 12. The belt material is looped over and the ends 118, 120 are butted together as shown. A small connecting piece of the same positive drive belt material 122 is used to help join the ends. By interlocking the teeth of the connecting piece of belt material 122 with the teeth of the butted ends 118, 120 of the belt material, the ends 118, 120 are positioned in accurate alignment. Outer and inner plates, 124 and 126, respectively, are positioned at the joined ends and are bolted together to form a secure joint. Label carriage assembly 38 is bolted through the outer plate 124, the butted belt ends 118, 120 and the inner plate 126 forming a strong and sturdy bond between the label carriage assembly 38 and the positive drive belt 110.

In one preferred embodiment of the present invention illustrated in FIGS. 5–8, each label carriage assembly 38 comprises three major components. The first of these components is a rotatable drum 128 adapted to hold a plurality of printed labels 84. The rotatable drum 128 is cylindrical in shape and rotates transversely through its center axis.

Drum 128 is provided with a plurality of flats 130 along its circumferences and tangent to the periphery of the drum surface for receiving printed labels 84 face down. Labels 84 are held in position on the flats 130 by spring loaded pins 132 located along the perimeter of the drum 128 and positioned to engage the outside edges of the printed labels 84. In the embodiment shown in FIGS. 5–8, there are two pins 132 for each flat on the surface of drum 128. A stepper motor 134 provides controlled rotational motion of drum 128 through drive belt 136.

Figure 4:
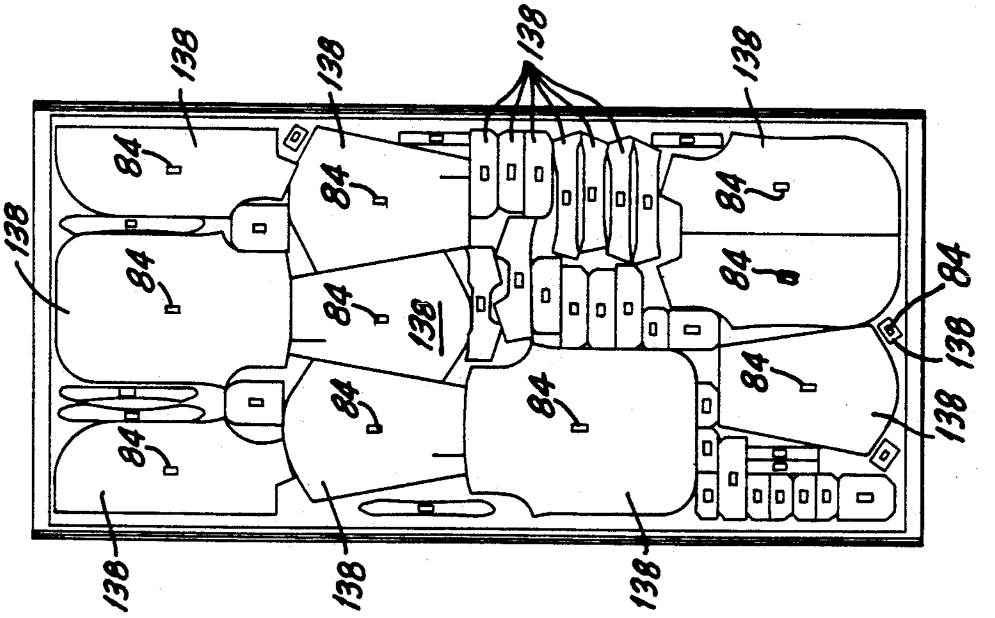
FIG. 4 is a plan view of a plotted representation for a layup of sheet material showing labels positioned on the patterned pieces.
Figure 6:
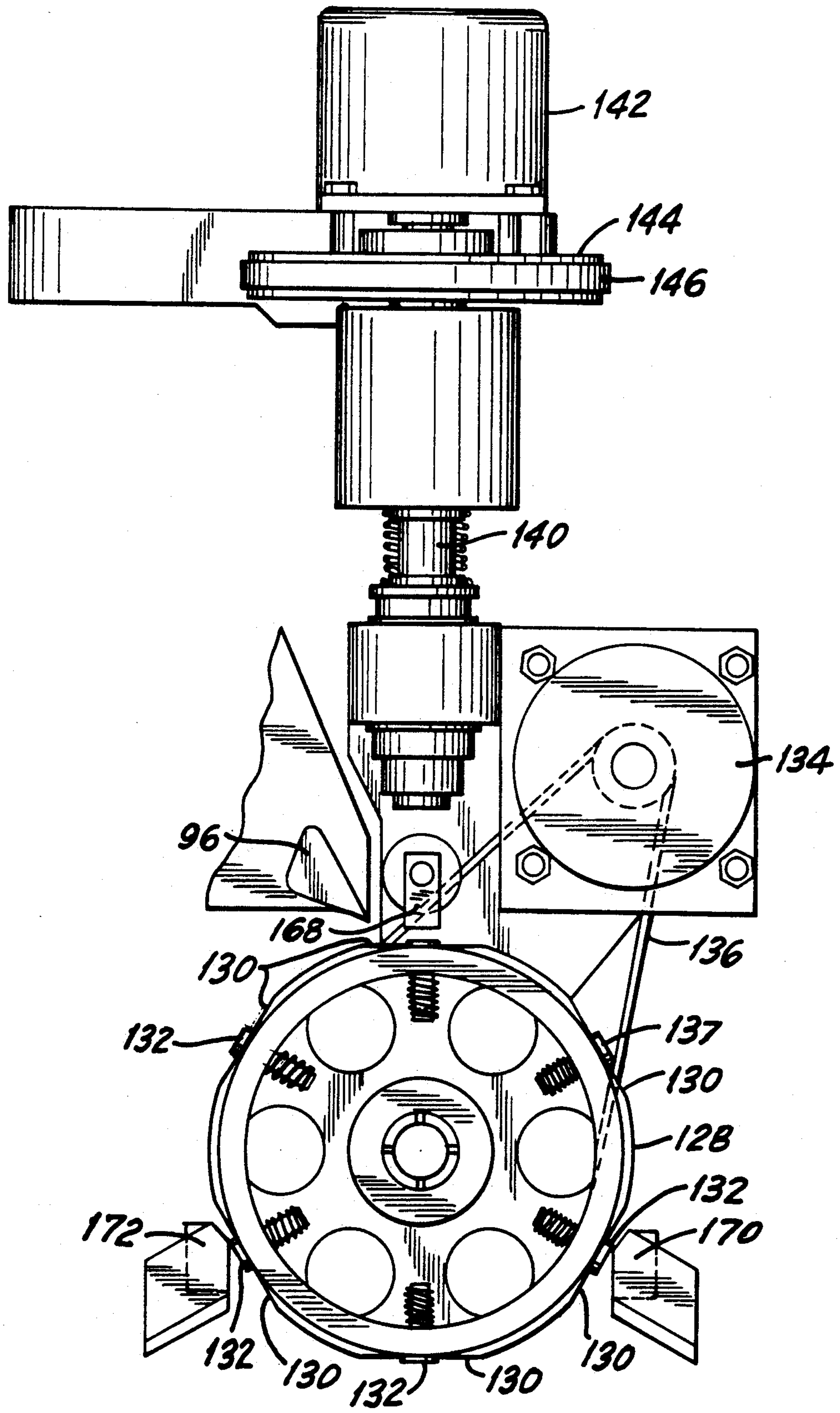
FIG. 6 is a side view taken along line 6—6 of FIG. 5 of the label carriage assembly.
Figure 7:
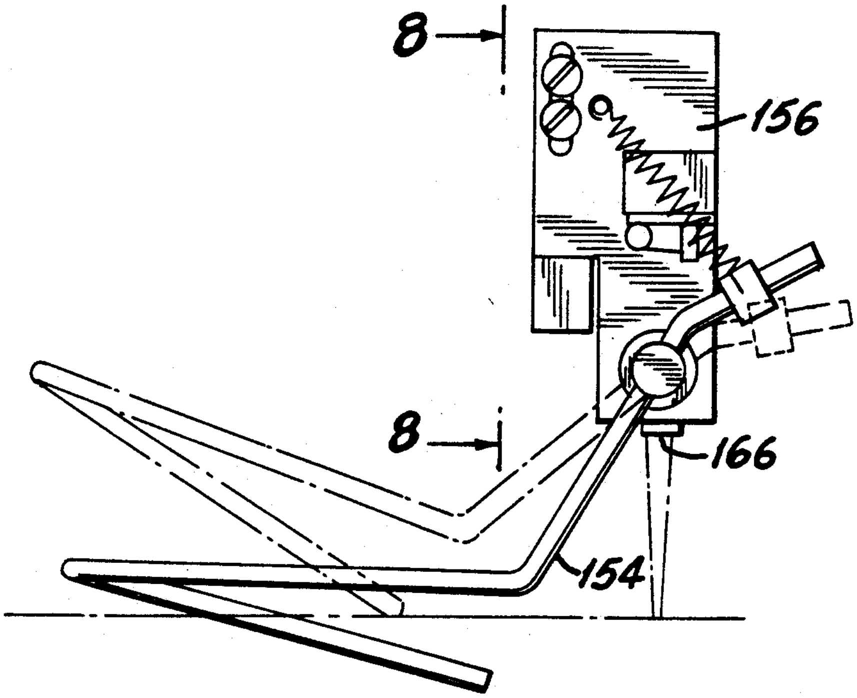
FIG. 7 is a side view taken along line 7—7 of FIG. 3 of the pressure limit switch of the label carriage assembly.
Figure 8:
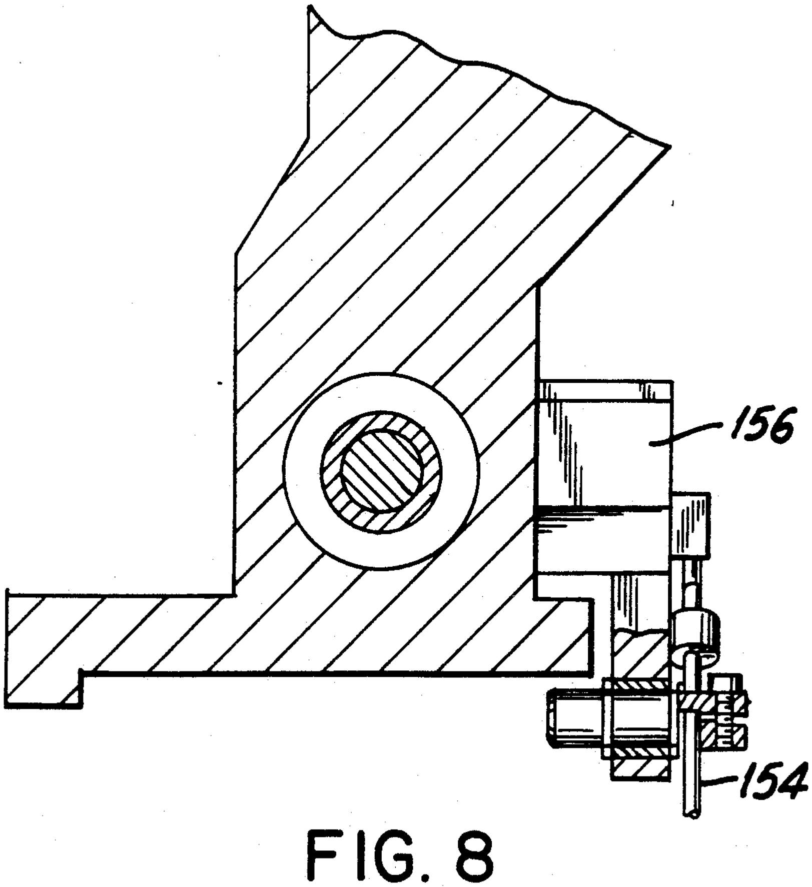
FIG. 8 is a frontal view taken along line 8—8 of FIG. 7 of the limit switch.

Due to the random nature of the shapes of the various pattern pieces 138 to be labeled, it is sometimes necessary to apply the printed label 84 in an angular orientation (See FIG. 4). In order to facilitate placement of labels in any desired angular orientation, an angular control mechanism is provided as the second major component of the label carriage assembly Drum 128 is mounted to the label carriage assembly on a vertical spring loaded shaft 140 perpendicular to the drum's axis of rotation. A stepper motor 142 drives a pulley 144 through drive belt 146. Pulley 144 is attached to the upper end of vertical spring loaded shaft 140 for rotation about a horizontal plane. Activation of stepper motor 142 controls the degree of angular rotation of drum 128 prior to application of the printed label 84.

The third major component of the label carriage assembly is the height control mechanism for controlling movement of the drum 128 in the Z-coordinate direction. A clearance between drum 128 and the surface of the layup of sheet material 34 is maintained whenever label carriage assembly 38 is not actually applying a label 84. This is to allow the apparatus 30 to traverse the entire surface of the spreading table 32 in the X- and Y-coordinate directions without interfering with the sheet material 34 spread on the table. Once label carriage assembly 38 is brought into position over the location where a printed label 84 is to be applied, drum 128 is lowered into contact with the top layer of the sheet material 34. Vertical movement of the label carriage assembly is accomplished by means of a vertically mounted lead screw 148, directly coupled by a helical flex coupling 150 to a stepper motor 152. Two additional Round Way® bearings 149 are provided parallel to lead screw 148 for alignment and support of the carriage in the Z-coordinate direction. Activation of stepper motor 152 provides the vertical motion required to lower drum 128 to the sheet material surface and return it back to an elevated position.

In a particularly advantageous embodiment of the present invention, the label carriage assembly 38 further includes a contact sensor mechanism for sensing and adjusting vertical travel of the drum. The contact sensor mechanism includes a wire cage presser foot 154 (best seen in FIGS. 7–8) which activates a micro switch 156 when it comes in contact with the top surface of the layup of sheet material 34 (shown in phantom in FIG. 7). Feedback from this contact sensor mechanism allows the automated labeling apparatus to automatically accommodate variations in the height of the layup of sheet material 34 without requiring manual setting and adjustment. Activation of the presser foot also ensures that the sheet material is not disturbed during the labeling process. Furthermore, the label carriage assembly 38 is protected from the shock or damage caused by impact of the drum 128 on the layup of sheet material 34 by the vertical spring loaded shaft 140 which acts as a shock absorber to absorb impact force.

A central processing computer 158 controls and coordinates all of the functions of the labeling apparatus 30 including, inter alia, movement in the X-, Y- and Z-coordinate direction, printing of labels with predetermined information, loading of preprinted labels onto the drum 128 as well as diagnostic self checks of the automated systems.

In a particularly advantageous embodiment of the present invention a standard IBM personal computer is programmed with the coordinates of the predetermined label locations within the periphery or profile of the pattern pieces 138 to be subsequently cut from the layup of sheet material 34 (See FIG. 4). The computer 158 is also provided with the appropriate identifying indicia to be printed on each label. This information is compiled and a labeling sequence is determined for the most efficient throughput for a given layup of sheet material.

Using well known numerical control techniques for the control of multi-axis machines, the computer 158 sequences the printing, loading, alignment, application and reloading of labels by the labeling apparatus 30. Since both numerical control techniques and position programming is well known to those skilled in the art, an exhaustive description of those techniques are not provided.

Operation of the automated labeling apparatus 30 in accordance with the present invention will occur generally in the following sequence. First, at least one layer of sheet material 34 is spread out and inspected on a spreading table 32. In most instances a number of spreading tables will be in use simultaneously in order to provide a continuous volume of material to the cutter operation (not shown).

The automated labeling apparatus is brought to the spreading table 32, preferably on a transfer table 160, and moved into position over the layup to be labeled AC power is picked up from a power channel 162 through a sliding plug 164 which is adapted to travel along power channel 162 in the X-coordinate direction as the apparatus moves.

The automated labeling apparatus 30 is then indexed at a predetermined position on the layup of sheet material 34. This indexing provides a reference point from which the central processing unit 158 directs the movement and operation of the labeling apparatus. In a preferred embodiment of the invention, a bright LED pointer 166 is mounted to the labeling carriage assemblies (see FIG. 7). This pointer 166 aids the operator of the equipment in accurately positioning the apparatus for indexing.

Figure 9:
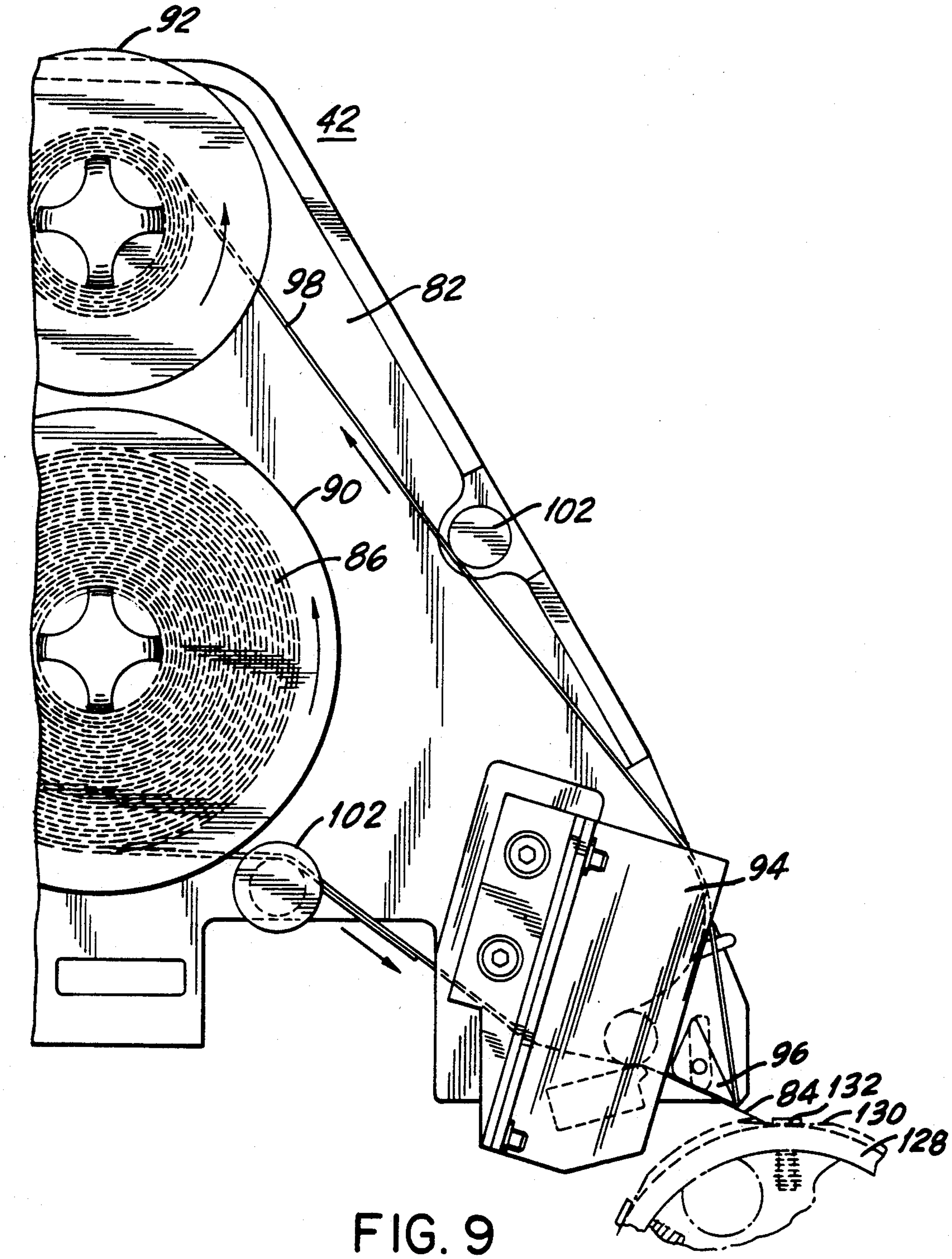
FIG. 9 is a fragmentary side view taken along line 9—9 of FIG. 3 of the printer-load station with supply and take-up reels for adhesive backed labels.

At this stage, a diagnostic check can be run to insure that all of the assemblies are operating properly Once proper operation is confirmed, the operator initiates the labeling sequence. The label carriage assemblies 38 are moved to their respective load stations 42 and present the drum 128 in position in front of the peeler bar 96 of the printer-load station as shown in FIG. 9. The bottom edge of the peeler bar 96 is situated above the flats 130 on the drum 128. By accessing the data file containing the label information within the central processing unit 158 the printer is directed to print the labels in the sequence in which they are to be applied.

As the printed labels 84 pass over the edge of the peeler bar 96, the printed labels are separated from the carrier web 98. The printed label 84, adhesive side up, is directed onto a flat 130 on the cylindrical drum 128. As the label 84 moves onto the flat 130, spring loaded pins 132 are electromagnetically raised to accommodate the label between the pins. When the label is in position, the pins 132 are retracted to their original position. Label 84 will remain in position on the flat 130 of the drum 128 by the force imposed by the heads of pins 132.

Drum 128 is then rotated to the next flat 130 to receive another label. This process is repeated for each of the flats on the drum. In a preferred embodiment of the invention, an optical sensor 168 is provided to verify that all of the flats 130 have been properly loaded.

Once the drums 128 have been loaded with printed labels 84, the label carriage assemblies 38 are moved out of the printer-load station 42 and begin the label placement process. The data file containing the numerical placement data for the labels in the X- and Y-coordinate directions and angular placement data is accessed and the central processing unit 158 directs the labeling apparatus to the first placement position. Once in position over the desired label location, the proper angle is set and the drum 128 is oriented so that the label to be applied is above and horizontal to the surface of the sheet material 34.

Second optical sensor 170 may optionally be provided adjacent the placement position of drum 128 (see FIG. 6) to insure that the label is properly in place on flat 130 prior to application.

With the label carriage assembly 38 in place, the drum 128 is lowered to contact the surface of the layup of sheet material 34 and then raised to an elevated position above the applied label 84. The adhesive force of the label 84 overcomes the holddown force of the pins 132 and the label 84 remains securely in place on the top layer of sheet material.

A third optical sensor 172 may also be provided adjacent the placement position of drum 128 (see FIG. 6) and is used as the placement feedback sensor. Where this sensor is utilized, the drum 128 is positioned in front of the sensor and scanned to insure that the label is not still affixed to the flat 130.

This process continues until all of the printed labels retained on drum 128 have been applied to their predetermined location on the top sheet of the layup. Efficient operation and fast throughput of the layup is accomplished by having one label carriage assembly applying labels as the second label carriage assembly is reloading its drum 128. In this fashion, label loading and application are taking place simultaneously. This ensures that the apparatus 30 always has a loaded carriage ready for application.

In the event of a malfunction, the central processing unit 158 will cease labeling operations and return the malfunctioning labeling carriage assembly to the operator's station for repair. For example, if a label has been retained by the drum 128, the carriage will return and allow the operator to remove the problem label. The apparatus is then reactivated and the misapplied label data is added back into the system for reprinting and reapplication.

Once the entire layup of sheet material has been labeled, the sliding plug 164 of the automated labeling apparatus is disconnected from the power channel 162 and the apparatus is rolled onto transfer table 160 for movement to an adjacent spreading table. The process then continues as above.

To the extent not already indicated, it also will be understood by those of ordinary skill in the art that any one of the various specific embodiments herein described and illustrated may be further modified to incorporate features shown in other of the specific embodiments.

The invention in its broader aspects therefore is not limited to the specific embodiments herein shown and described but departures may be made therefrom within the scope of the accompanying claims without departing from the principles of the invention and without sacrificing its chief advantages.

We claim:

1. Automated labeling apparatus for applying identifying labels each label being applied directly at a predetermined position along a top sheet of a layup of sheet material on a table comprising:

a movable support beam means positionable on said table and moveable over said layup of sheet material;

a plurality of labeling means mounted on said support beam means for independent transverse movement thereon and vertically adjustable relative to said layup of sheet material wherein each said labeling means is moveable independently of other labeling along the entire length of said support beam means;

at least one label printing means for printing identifying information on labels accessible to said labeling means; and control mans for controlling and coordinating movement of said support beam means and labelling means and operation and printing of said label printing means.

2. Automated labeling apparatus as in claim 1 wherein said labeling means includes a rotatable drum having a plurality of load positions thereon for releasably receiving a preprinted label in each said load position from a label printing loading means and rotatably applying said labels in a predetermined sequence.

3. Automated labeling apparatus as in claim 1 wherein said labels are adhesive backed.

4. Automated labeling apparatus as in claim 1 further comprising steering means mounted to said support beam means to facilitate alignment of said beam along said table.

5. Automated labeling apparatus as in claim 1 wherein said label printing-loading means include a thermal printer for printing identifying indicia onto said labels.

6. Automated labeling apparatus as in claim 1 wherein said label-printing means includes an electrostatic printer.

7. Automated labeling apparatus for applying identifying labels at predetermined positions on a top sheet of a layup of sheet material spread onto a spreading table comprising:

a moveable support beam positionable on said spreading table and moveable over said layup of sheet material;

a plurality of labeling carriages movably mounted on said support beam for independent transverse movement thereon and vertically adjustable relative to said layup of sheet material wherein each said labeling carriage is moveable independently of other labeling along the entire length of said support beam means carriages;

label applicator means attached to each of said labeling carriages for retaining and applying preprinted labels onto said layup of sheet material;

at least one label printing station, accessible to said label applicator means for printing identifying information on labels; and control means for controlling and coordinating movement of said support beam, labeling carriage, label applicator means and said label printing station.

8. Automatic labeling apparatus as in claim 7 wherein said label applicator means comprises a rotatable drum having a plurality of load positions around the periphery thereof for releasably receiving preprinted labels from said label printing station.

9. Automated labeling apparatus as in claim 7 wherein said label printing station includes a web of adhesive labels, a printing means, a peeling means for removing said labels from said web after printing and a take-up reel for collecting said web.

10. Automated labeling apparatus as in claim 9 wherein said printing means is a thermal printer.

11. Automated labeling apparatus for applying identifying labels each label being applied directly at a predetermined position along a top sheet of a layup of sheet material on a spreading table comprising:

a support beam having side supports located at either end thereof, said side supports having wheels for moving said support beam along the spreading table over the layup of sheet material;

drive means connected to said wheels;

a plurality of labeling carriages movably mounted on said support beam for independent transverse movement along said support beam and independently vertically moveable relative to the layup of sheet material wherein each said labeling carriage is moveable independently of other labeling along the entire length of said support beam means carriages;

drum applicator means rotatably mounted on said labeling carriages, said drum applicator means including a plurality of label loading positions for releasably holding labels;

at least one printing station mounted on said apparatus accessible to said drum applicator means and including a web of labels, a printer, and a means for removing said labels from the web;

central processing control means for controlling and coordinating said drive means, labeling carriages, drum applicator means and printing station so that said drum applicator means cooperate to simultaneously load and apply said labels on said layup of sheet material.

12. Automated labeling apparatus as in claim 11 further comprising a transfer means for supporting and moving said automated labeling apparatus from one table to another.

13. Automated labeling apparatus as in claim 12 further comprising sensor means for adjusting the vertical height of said drum applicator.

14. Automated labeling apparatus as in claim 11 further comprising optical sensor means for sensing the loaded condition of said drum applicator.

15. Automated labeling apparatus as in claim 11 further comprising an optical encoder for providing linear positioning information to said central processing control means.

16. Automated labeling apparatus as in claim 11 wherein one of said side supports is pivotally attached to said support beam.

17. Automated labeling apparatus as in claim 13 wherein said sensor means comprises a presser foot in combination with micro switch to sense and adjust the vertical height of said drum applicator.

18. A method for applying identifying labels directly at predetermined positions along a top sheet of a layup of sheet material on a spreading table comprising the steps of:

supporting a plurality of labeling carriages adapted for independent transverse and vertical motion above the layup of sheet wherein each said labeling carriages is moveable independently of other labeling means along the entire length of said support beam means material;

printing identifying indicia onto labels;

delivering the printed labels to the plurality of labeling carriages;

controlling vertical, longitudinal and transverse movement of the labeling carriages to apply identifying labels directly onto a top layer of a layup of sheet material at predetermined locations.

19. A method for applying identifying labels as in claim 18 further comprising the step of sensing label location on said label carriage to confirm placement of the label.

20. A method for applying identifying labels as in claim 19 further comprising the step of automatically sensing and adjusting vertical height of the label carriage above said layup of sheet material.

21. Automated labeling apparatus as in claim 1, wherein the table is a spreading table.

* * * * *